United States Patent [19]
Fairhurst

[11] Patent Number: 5,270,803
[45] Date of Patent: Dec. 14, 1993

[54] INVERSE HYPERBOLIC COMB FILTER
[75] Inventor: Jon A. Fairhurst, Grass Valley, Calif.
[73] Assignee: The Grass Valley Group, Inc., Nevada City, Calif.
[21] Appl. No.: 966,635
[22] Filed: Oct. 26, 1992
[51] Int. Cl.$^5$ .............................................. H04N 9/78
[52] U.S. Cl. ............................ 358/31; 358/36
[58] Field of Search ............ 358/31, 36, 21 R, 21 V; 364/724.16, 728.05, 724.05, 724.08, 724.06, 724.01, 825

[56] References Cited

U.S. PATENT DOCUMENTS

| | | | |
|---|---|---|---|
| 4,907,073 | 3/1990 | Sugiyama | 358/31 |
| 5,150,202 | 9/1992 | Ledinh et al. | 358/31 |

FOREIGN PATENT DOCUMENTS

| | | | |
|---|---|---|---|
| 0041392 | 2/1989 | Japan | 9/78 |
| 0042989 | 2/1991 | Japan | 9/78 |
| 0042990 | 2/1991 | Japan | 9/78 |

Primary Examiner—Victor R. Kostak
Assistant Examiner—Nathan J. Flynn
Attorney, Agent, or Firm—John Smith-Hill; Francis I. Gray

[57] ABSTRACT

An inverse hyperbolic comb filter decodes an encoded signal by subtracting a vertically filtered and horizontally filtered version of the encoded signal from a delayed version of the encoded signal whereupon the resulting output is further horizontally filtered to provide a first decoded output. A twice delayed version of the input signal then has the first output signal subtracted therefrom to provide a second output. Optional further vertical filtering may be employed to vertically filter the output of the first subtractor before the final horizontal filtering is performed. The filter may also be employed in encoding signals wherein the components to be encoded are first filtered prior to combining. The inverse hyperbolic comb filter is applicable to any system employing combining of two-dimensional signals via quadrature modulation and may also be employed in three-dimensional systems.

15 Claims, 20 Drawing Sheets

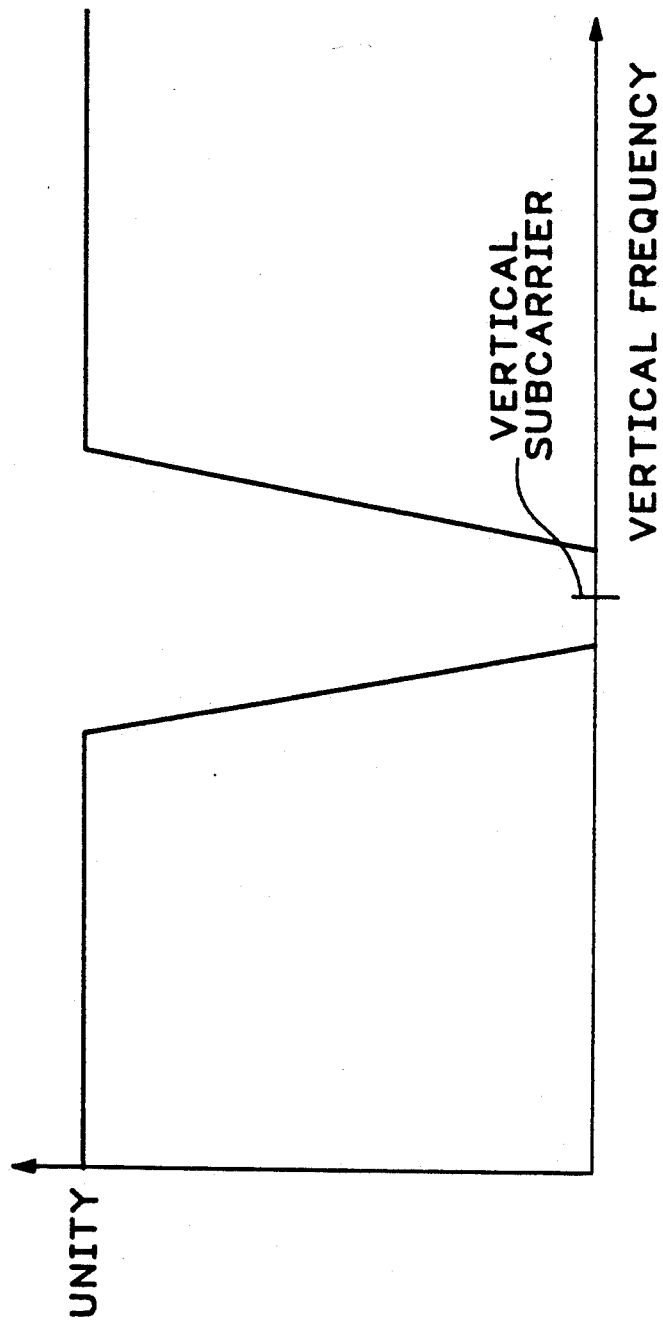

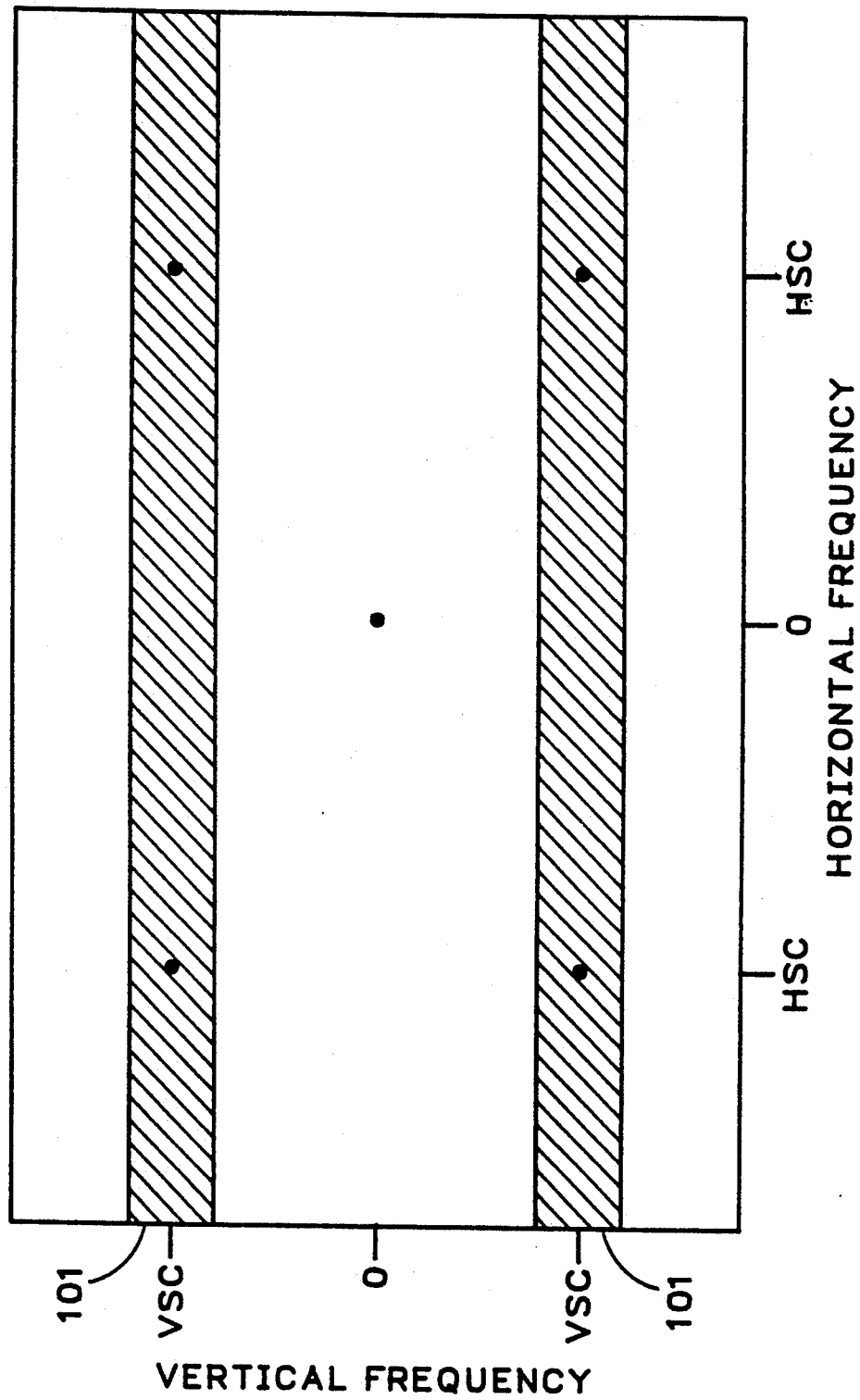

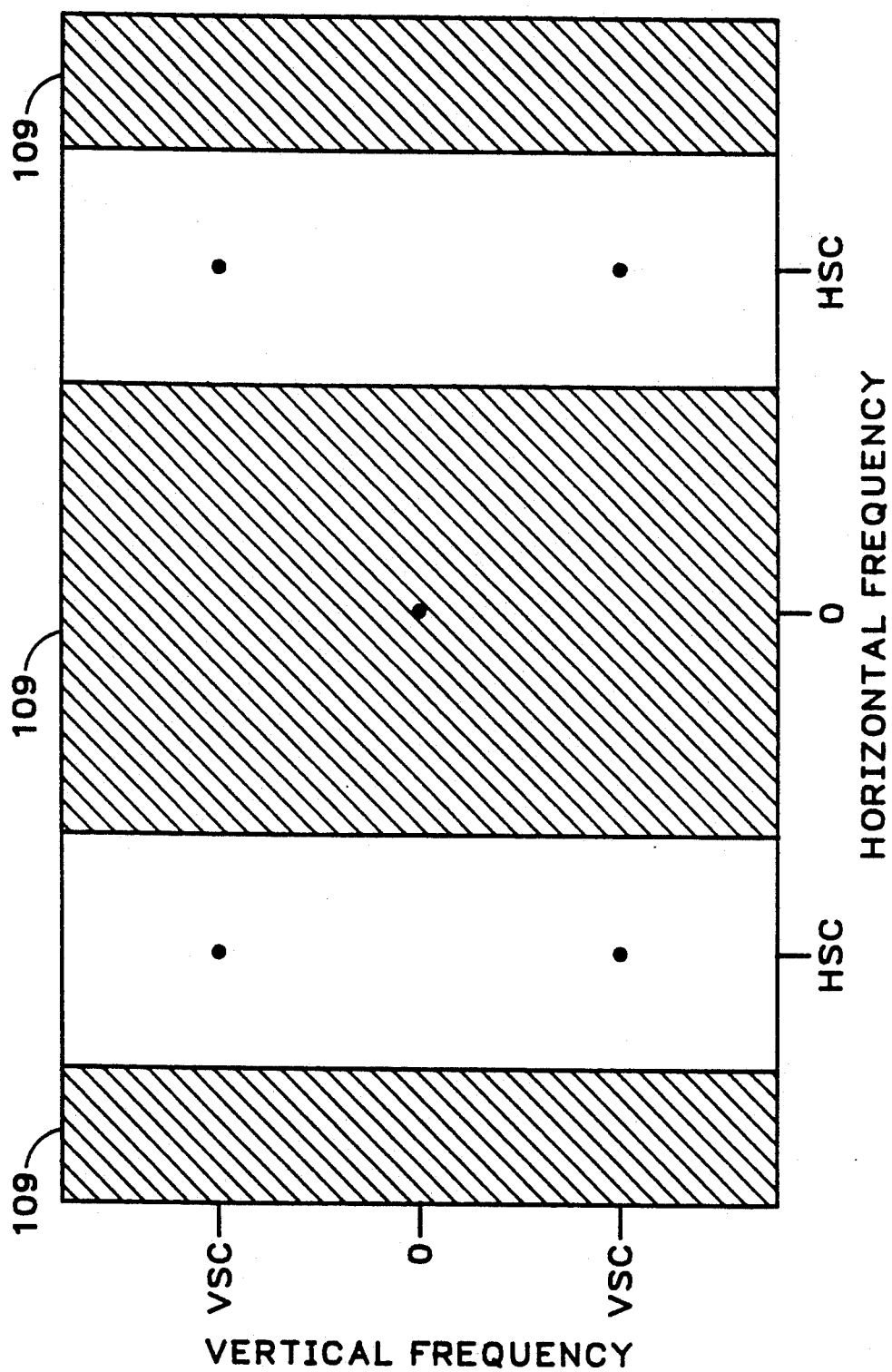

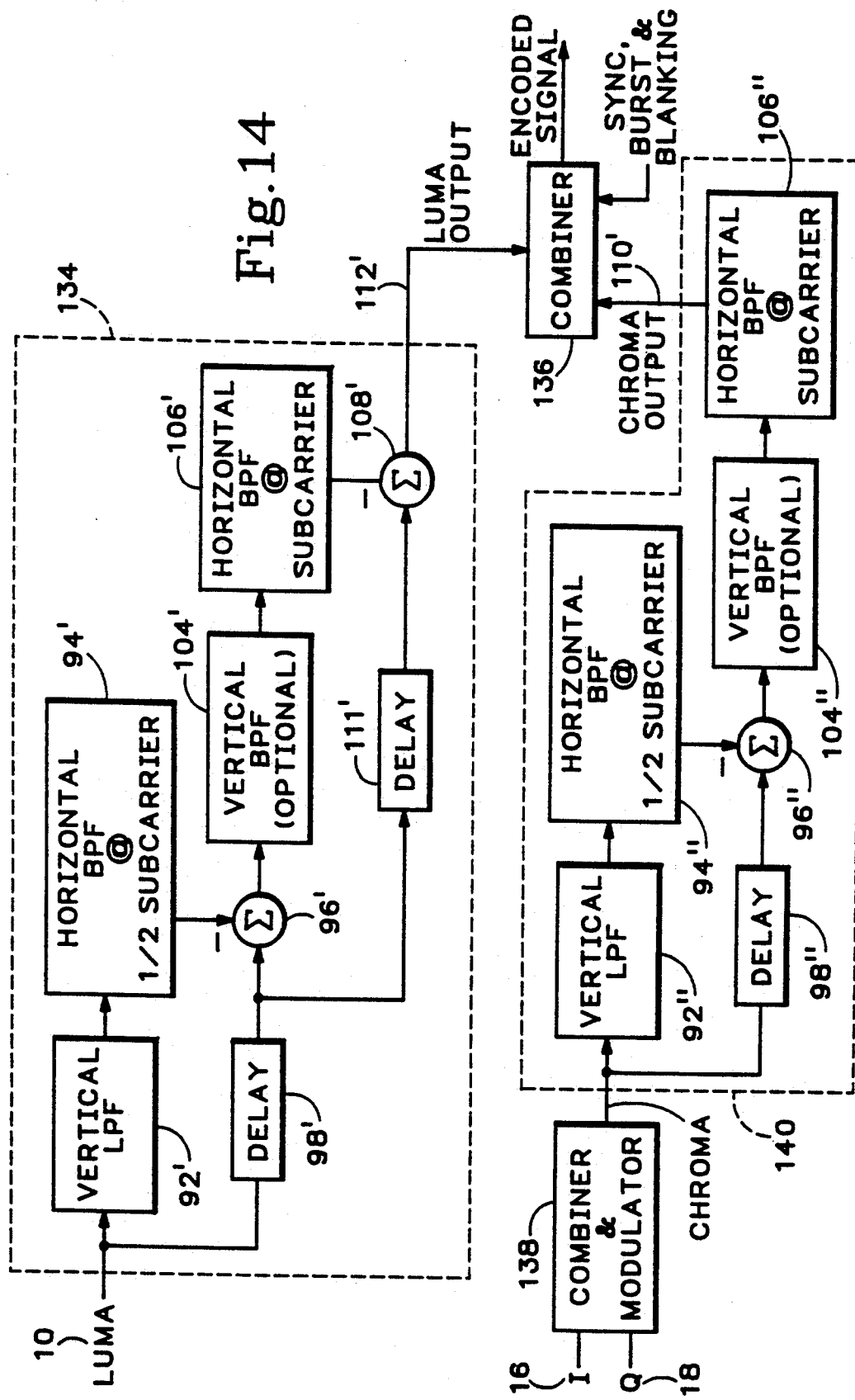

INVERSE HYPERBOLIC COMB FILTER

BACKGROUND OF THE INVENTION

This invention relates to video encoding and decoding and more particularly to a comb filter for use in encoding and decoding signals.

An NTSC composite video signal is formed by combining a luminance (luma) component and a chrominance (chroma) component. The chroma component is formed by modulating the phase and amplitude of a subcarrier having a frequency of about 3.58 MHz. The frequency of the subcarrier is selected so that if the phase of the subcarrier remains constant from line to line, the subcarrier on a given line is 180° out of phase relative to the subcarrier on the next line. Accordingly, whereas the video signal may be considered as having a horizontal subcarrier frequency of 3.58 MHz, the frequency of the subcarrier in the vertical dimension corresponds to twice the horizontal line duration of the signal, or about 7.87 kHz. For the a PAL signal, the vertical subcarrier frequency corresponds to four times the horizontal line duration of the signal.

The encoding and decoding processes for video signals employ filters. Referring to FIG. 1, a block diagram of a one-dimensional video encoding/decoding system employed with color television signals in accordance with the prior art, a luma component Y is supplied at input terminal 10 to a delay 12 and then provided to modulator and combiner 14. The modulator and combiner also receives two chroma components I and Q at input terminals 16 and 18 via respective low-pass filters 20 and 22. Delay 12 is provided to compensate for the delay of filters 20 and 22. The modulator and combiner 14 also receives sync, burst and blanking signals 24 and produces an encoded output signal 26.

Once the encoded signal is to be decoded (for example, at a receiver) the encoded signal 26 is supplied to bandpass filter 28 and the output thereof is fed to demodulator and separator 30 thereby producing the output chroma signals I' and Q' at terminals 32 and 34. Encoded signal 26 is also provided to delay 36 (which compensates for the delay of bandpass filter 28) and the output of delay 36 is combined with the output of bandpass filter 28 via subtractor 38 to provide a luma signal which, when passed through delay 40 (to compensate for the delay of demodulator and separator 30), produces the output luma signal Y' at terminal 42. This prior art method based on single dimension notch and bandpass filtering is plagued by cross-color and cross-luminance artifacts.

FIG. 2 is a block diagram of an improved prior art encoding apparatus employing comb filtering. The luma signal Y is supplied via input terminal 10 to a luma comb filter 44 which produces a filtered luma signal, while the chroma components I, Q are fed to input terminals 16 and 18 of a chroma comb filter with modulator 46 which generates a combined filtered chroma signal. The two outputs (filtered luma and combined filtered chroma) are supplied to combiner 48 (also receiving sync, burst and blanking 24) thereby producing encoded signal 50. The luma comb filter 44 has a vertical bandpass filter 52 receiving the luma input and a horizontal bandpass filter 54 receiving the output of vertical bandpass filter 52. The output of horizontal bandpass filter 54 is subtracted from a delayed version of the input luma signal (delayed by delay circuit 56 in order to compensate for delays inherent in filter 52 and filter 54) via subtractor 58 to produce the filtered luma output. The chroma comb filter/modulator 46 includes a horizontal low-pass filter 60 for filtering the I chroma component and a horizontal low-pass filter 62 for filtering the Q chroma component, with the outputs of filters 60 and 62 provided to modulator and combiner 64. The modulated output of the modulator/combiner 64 passes through vertical bandpass filter 66 before being supplied to combiner 48.

FIG. 3 is a block diagram of a corresponding prior art decoding apparatus that may be used in conjunction with encoding in accordance with FIG. 2 wherein the encoded signal 50 is supplied to a chroma comb filter 68 (comprising vertical bandpass filter 70 in series with horizontal bandpass filter 72), which provides a filtered chroma output. The output of the chroma comb filter 68 is supplied to demodulator and separator 74, producing the chroma output components I', Q', at terminals 32 and 34. The chroma comb filter 68 output is also the subtrahend of a subtractor 76 which receives the encoded signal (delayed by delay 78) as the minuend for producing the luma component which, being delayed by delay 80, is supplied at the output 42 as Y'. Delay 78 compensates for delays inherent in chroma comb filter 68. Similarly, delay 80 compensates for delays in demodulator and separator 74.

The comb filtering system in accordance with FIGS. 2 and 3 separates luma and chroma components in two dimensions as illustrated in FIG. 4. The signal has both vertical and horizontal frequency components wherein horizontal frequency components represent the frequency of the signal along a horizontal scan line of the video image and vertical frequency components represent the frequency of samples from one vertical line to corresponding samples from other vertical lines. The horizontal axis of FIG. 4 represents horizontal frequency, with zero frequency at the center of the axis, the horizontal subcarrier appearing at either side of the zero frequency value. Vertical frequency is represented on the vertical axis, with zero frequency at the center of the vertical axis, and the vertical subcarrier frequency appearing at either side of the zero axis. Movement along any direction away from luma center 84 represents a positive increase in frequency. Four quadrants are shown to illustrate filter response to the chroma components I, Q when either positive or negative (+I, +Q, −I, −Q).

Signals having frequencies falling within areas 82 are interpreted as chroma signals (each area 82 is roughly centered about the chroma center frequencies 100) and are passed through to the chroma output of the chroma comb filter 68 (and also suppressed from the luma output). Any signals falling outside of the areas 82 are interpreted as luma signals and suppressed from the chroma output (and included in the luma output). The chroma portions 82 represent the negative three decibel points of the vertical and horizontal bandpass filters.

Several problems arise when employing the simple comb filters in accordance with the prior art. First, in the general areas of reference arrows 86 of FIG. 4, (the areas near the two chroma horizontal subcarrier frequencies and centered vertically in line therewith) vertical high frequencies in chroma would exist, but because of the response of the chroma comb filter 68, chroma does not occupy these areas and the signals are interpreted as luma, which may result in cross-luminance artifacts. Another drawback to the simple comb filter method is the loss of high frequency diagonal luma resolution at reference points 88, near the innermost corners of areas 82, which may give rise to cross-color artifacts.

Other attempts in the prior art have included the use of diagonal shaped filters, but such filters require high complexity and are non-separable. In a separable filter having two-dimensional filtering aspects, the filtering may be performed in one dimension separately from the filtering in the second dimension resulting in less complex filtering operations. For example, an M-tap by N-tap digital separable filter requires M plus N multiplies, but if the filter is non-separable, it would require M times N multiplies, adding considerable cost.

SUMMARY OF THE INVENTION

In decoding an encoded input signal with an inverse hyperbolic comb filter, the encoded input signal is first vertically filtered followed by horizontal filtering of the vertically filtered signal and subtraction of the twice filtered signal from a delayed version of the encoded input signal. The resultant subtracted signal is then further horizontally filtered to provide a first output signal. An optional second vertical filter may be employed prior to the second horizontal filtering.

A second output signal may be extracted from the encoded input signal by subtracting the first output signal (produced by the second horizontal filter) from a further delayed version of the encoded input signal, thereby producing the second output signal.

The inverse hyperbolic comb filter may also be employed in encoding signals wherein input signal components are first filtered through respective inverse hyperbolic comb filters to provide filtered component signals, which are then provided to a combiner to generate an encoded output signal.

BRIEF DESCRIPTIONS OF THE DRAWINGS

FIG. 6A is a graph of the vertical dimension frequency response of filter 92 of FIG. 5;

FIG. 6B is a graph illustrating the frequency response of filter 92 in two dimensions;

FIG. 10B is a graph illustrating the two-dimensional response of filter 106;

FIG. 14 is a more detailed block diagram of the inverse hyperbolic comb filters used in an encoder as shown in FIG. 13.

DETAILED DESCRIPTION

Figure 5:
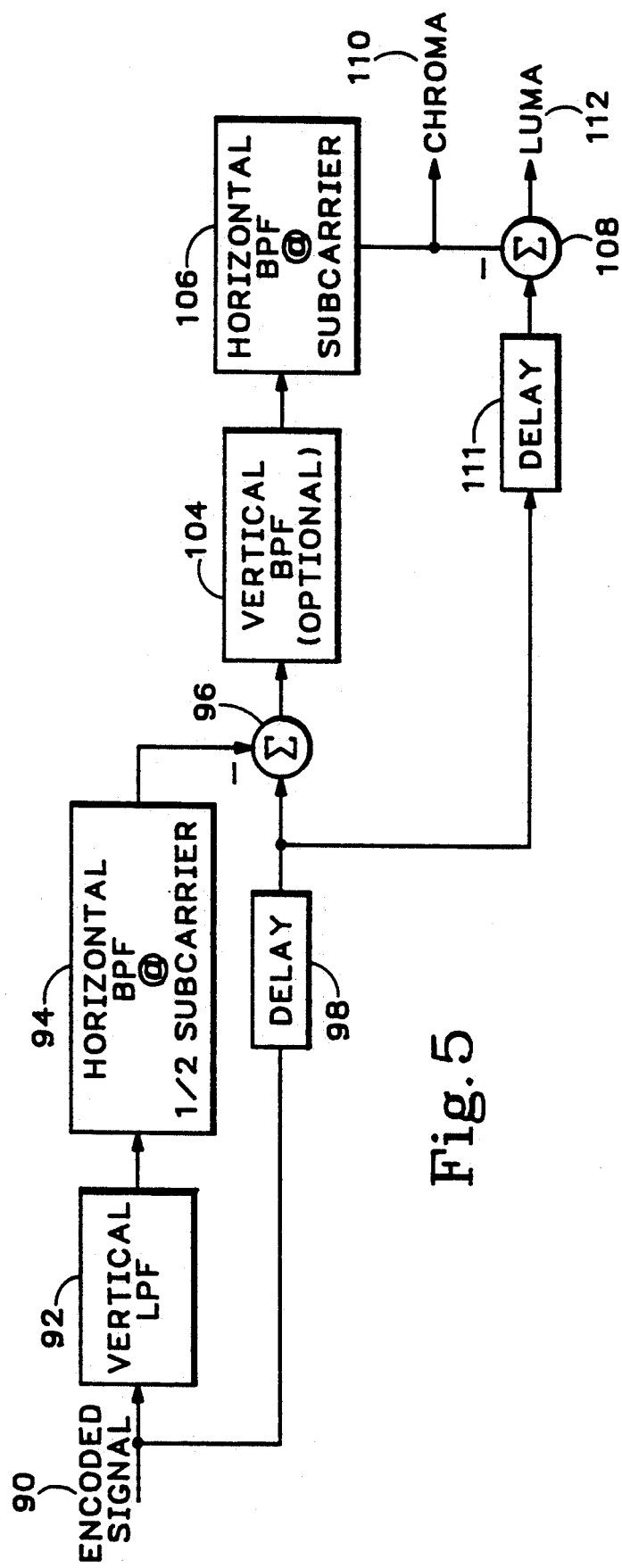
FIG. 5 is a block diagram of an inverse hyperbolic comb filter.

Referring now to FIG. 5, a decoder employing inverse hyperbolic comb filtering receives an encoded signal 90 wherein the encoded signal may be a video signal. The encoded signal is supplied to vertical low-pass filter 92, and the output thereof is the input to horizontal bandpass filter 94. The encoded signal is also supplied to delay 98, the output of which is the minuend input to subtractor 96, while the subtrahend input is provided by the output of horizontal filter 94. The output signal of the subtractor is supplied to an optional vertical bandpass filter 104, and the output thereof is the input to horizontal bandpass filter 106. The output of horizontal filter 106 is the chroma component signal 110, which is also provided as the subtrahend input to subtractor 108. A second delay 111 receives the output from the first delay 98, whereupon the output of delay 111 provides the minuend to subtractor 108. The output from subtractor 108 is luma signal 112.

Filter 92 preferably comprises a vertical multi-tap digital low-pass filter with a vertical frequency response as shown by the graph in FIG. 6A. The filter behaves as a bandstop filter, with its response reflecting about the vertical subcarrier frequency.

Frequencies other than those near the vertical subcarrier are passed by the filter but the filter has a stopband which is centered around the vertical subcarrier frequency. FIG. 6B illustrates the response of filter 92 in both the vertical and horizontal frequency domains wherein the vertical frequency components centered around the vertical subcarrier frequency (VSC) are removed (the stopband being indicated at reference 101). In the graph of FIG. 6B, vertical frequencies are portrayed in the Y-axis while horizontal frequencies are represented by the X-axis, with movement in any direction from the zero frequency point representing positive frequency movement. The four quadrants illustrate the response to the chroma components I, Q when positive or negative (+I, +Q, −I, −Q). All areas other than those within the stopbands 101 fall within the passband.

Figure 7A:
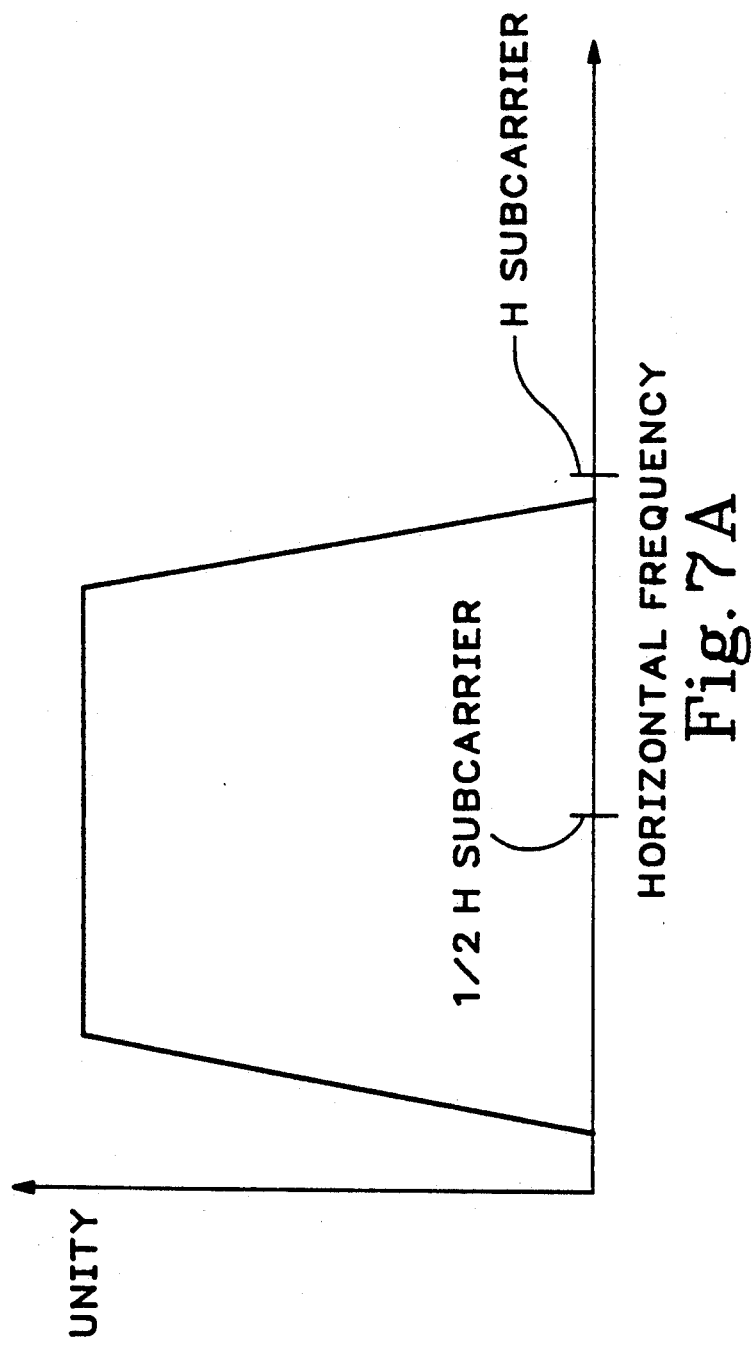
FIG. 7A is a graph of the horizontal dimension response of filter 94 of FIG. 5.
Figure 7B:
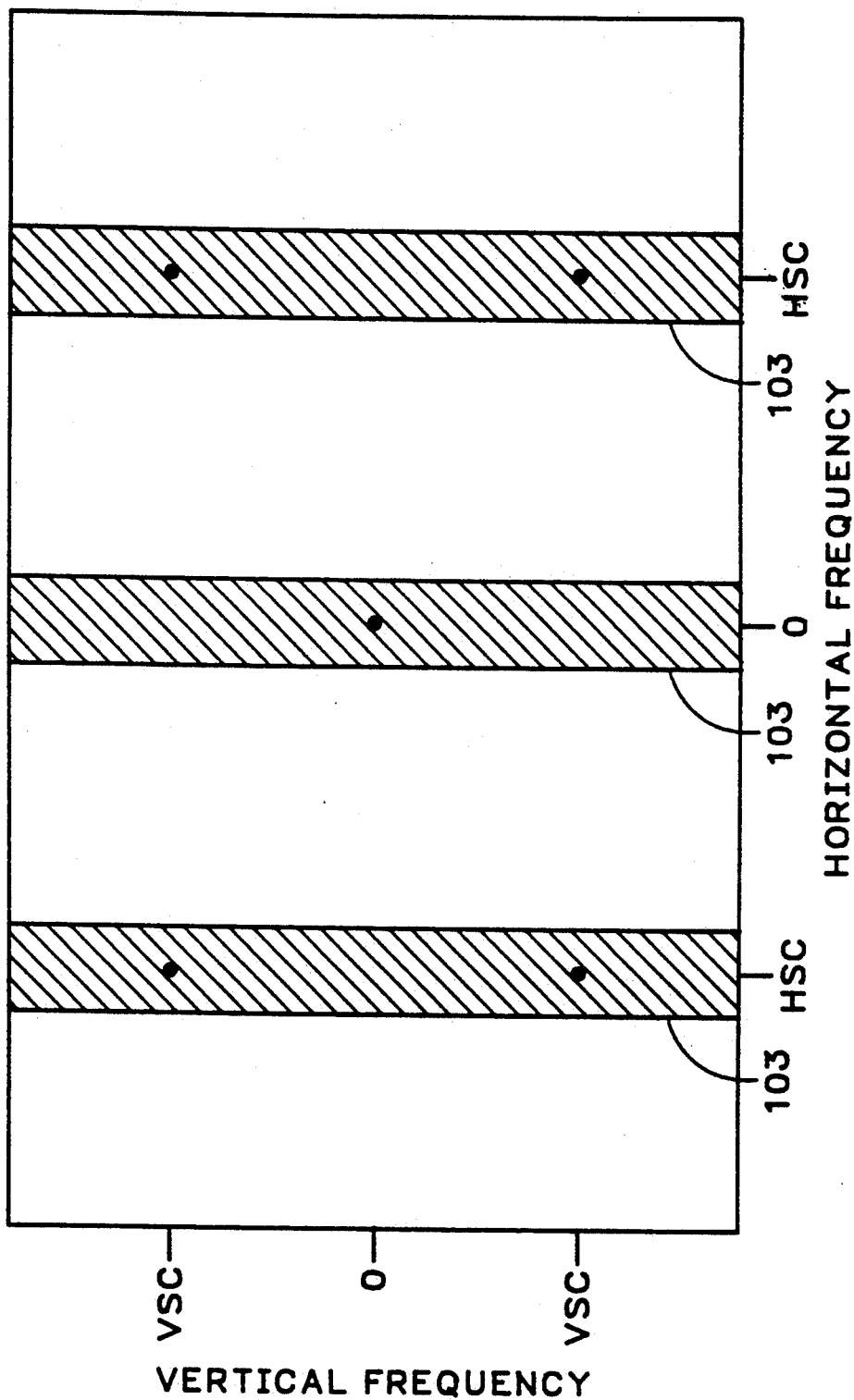
FIG. 7B is a graph illustrating the response of filter 94 in two dimensions.
Figure 7C:
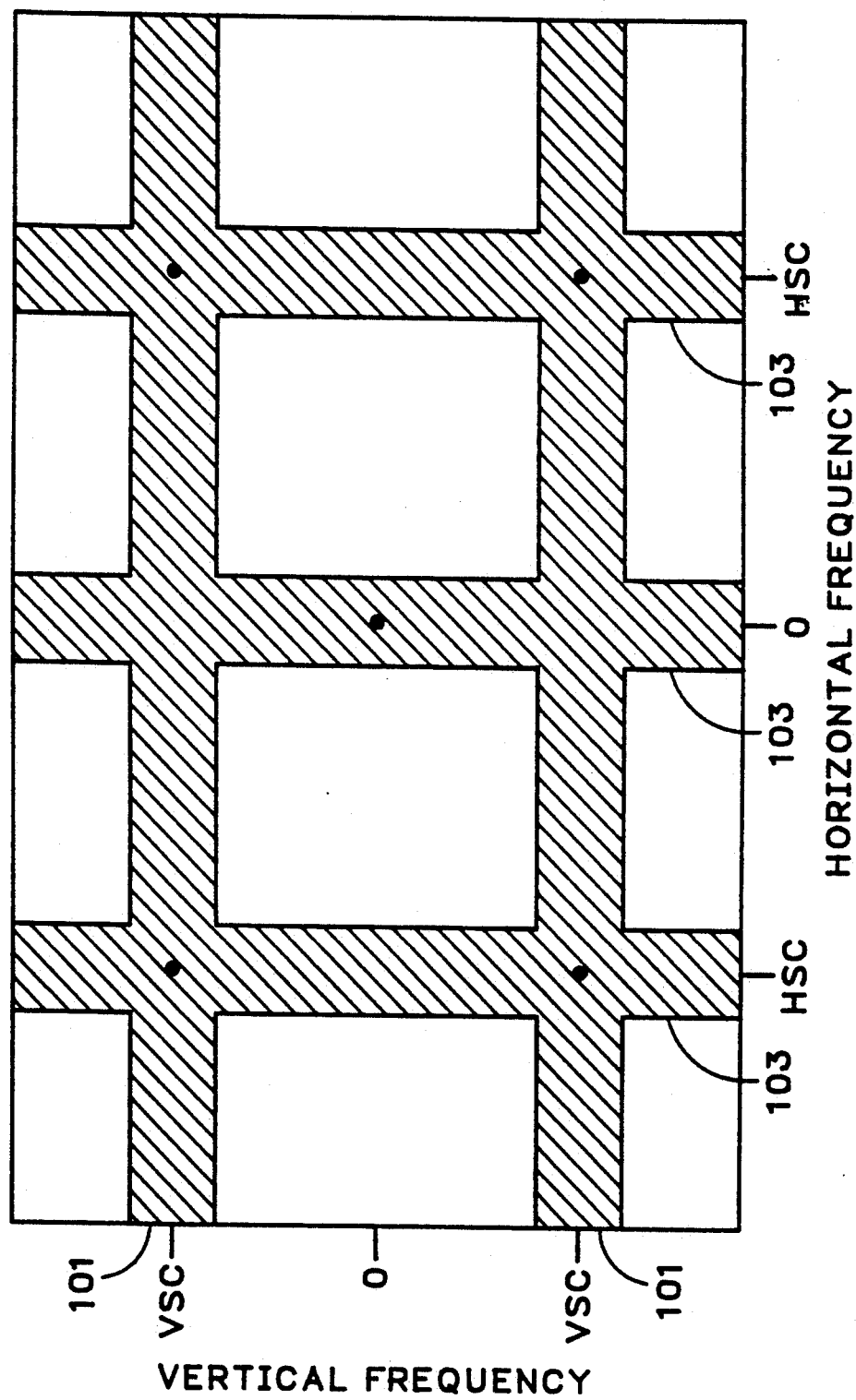
FIG. 7C is a graph illustrating the output of filter 94 of FIG. 5.

Once the vertical low-pass filtering is performed on the encoded signal by filter 92, the filtered output is horizontally filtered by filter 94 which has its passband centered at one half the chroma horizontal subcarrier frequency as shown by the response graph in FIG. 7A. The passband of filter 94 reflects around the chroma subcarrier frequency and may be most easily implemented in a system which samples at four times the chroma subcarrier frequency, with every other tap of filter 94 equal to zero. The independent response of filter 94 in two dimensions is illustrated in FIG. 7B wherein frequencies centered around zero and frequencies centered around the horizontal subcarrier frequency fall within stopbands 103. Having low frequencies (i.e., zero) fall within the stopband is not a requirement for operation of the inverse hyperbolic comb filter, but may allow implementation at reduced cost. FIG. 7C illustrates the signal output of filter 94 wherein the combined effects of filters 92 and 94 are seen, providing stopbands 101 and 103 as illustrated.

Figure 8:
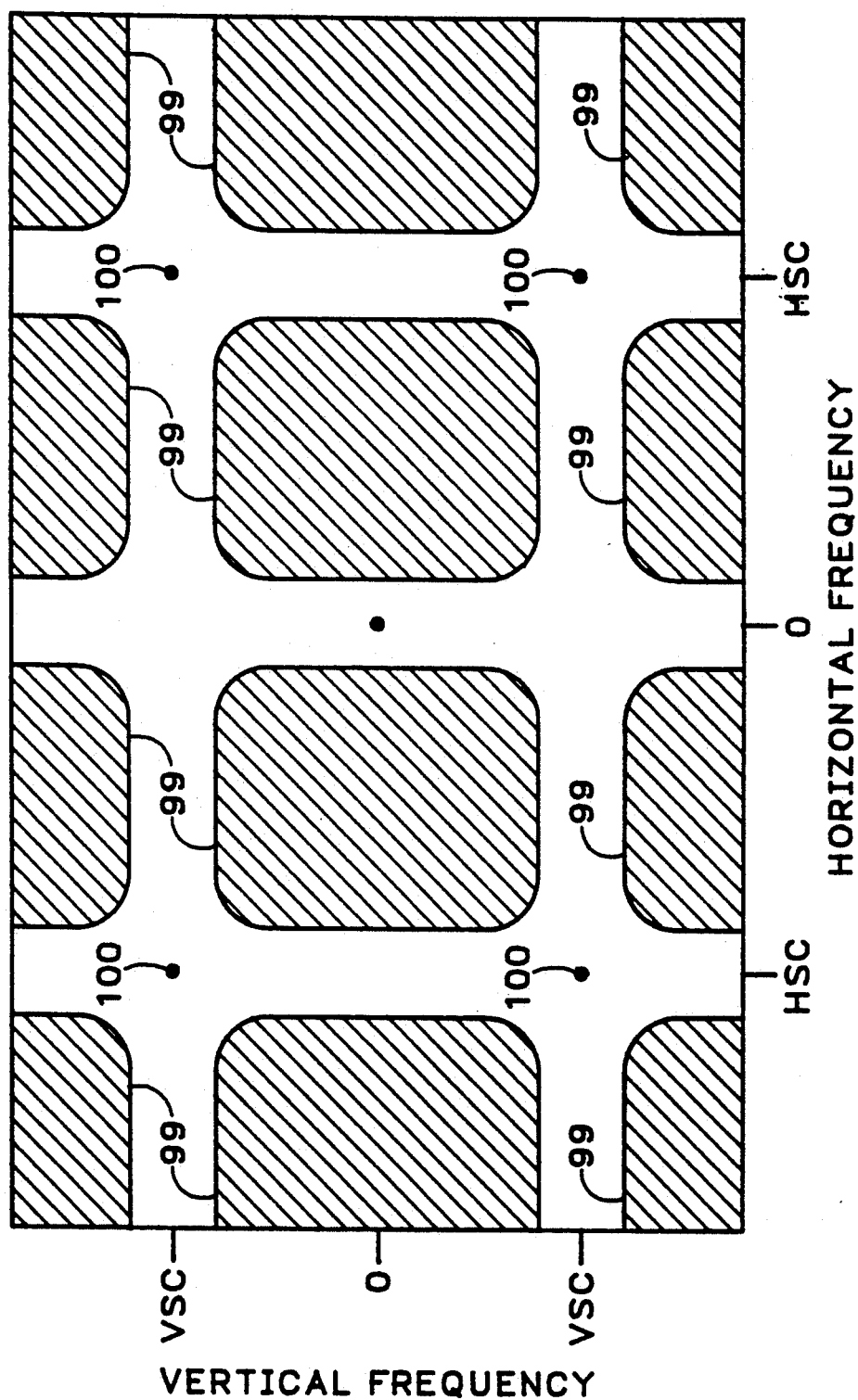
FIG. 8 is a graph of the output signal from subtractor 96 of FIG. 5.

The horizontally filtered output from filter 94 is then supplied as the subtrahend to subtractor 96, while a delayed version of encoded signal 90 is the minuend of subtractor 96. Delay stage 98 compensates for the delays of filters 92 and 94. The subtractor generates a signal which comprises the delayed encoded signal minus the vertical and horizontal filtered version thereof, and the frequency content of a signal as would appear at the output of subtractor 96 is graphically illustrated in FIG. 8, wherein the areas 99 represent frequencies that are blocked and the other areas represent frequencies that are passed.

Figure 9A:
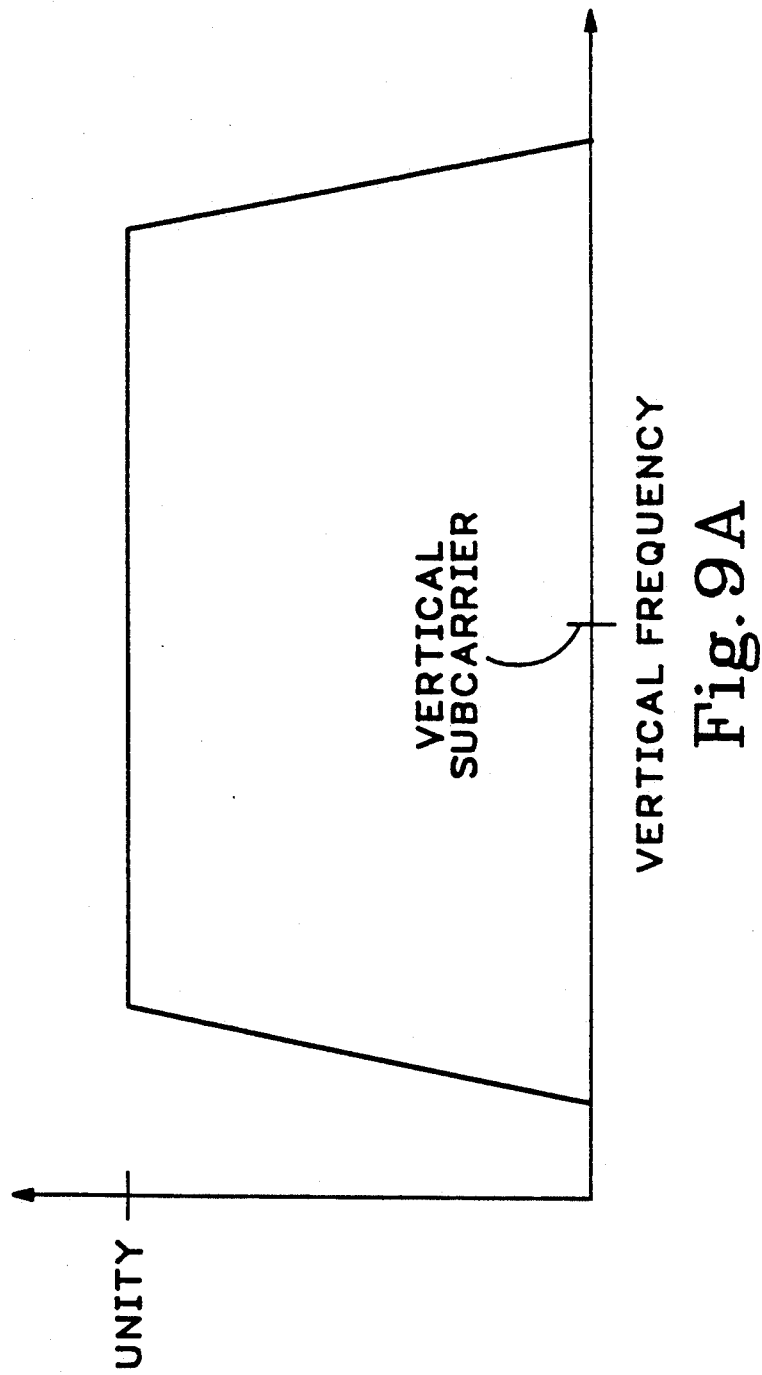
FIG. 9A is a graph of the vertical dimension frequency response of filter 104 of FIG. 5.
Figure 9B:
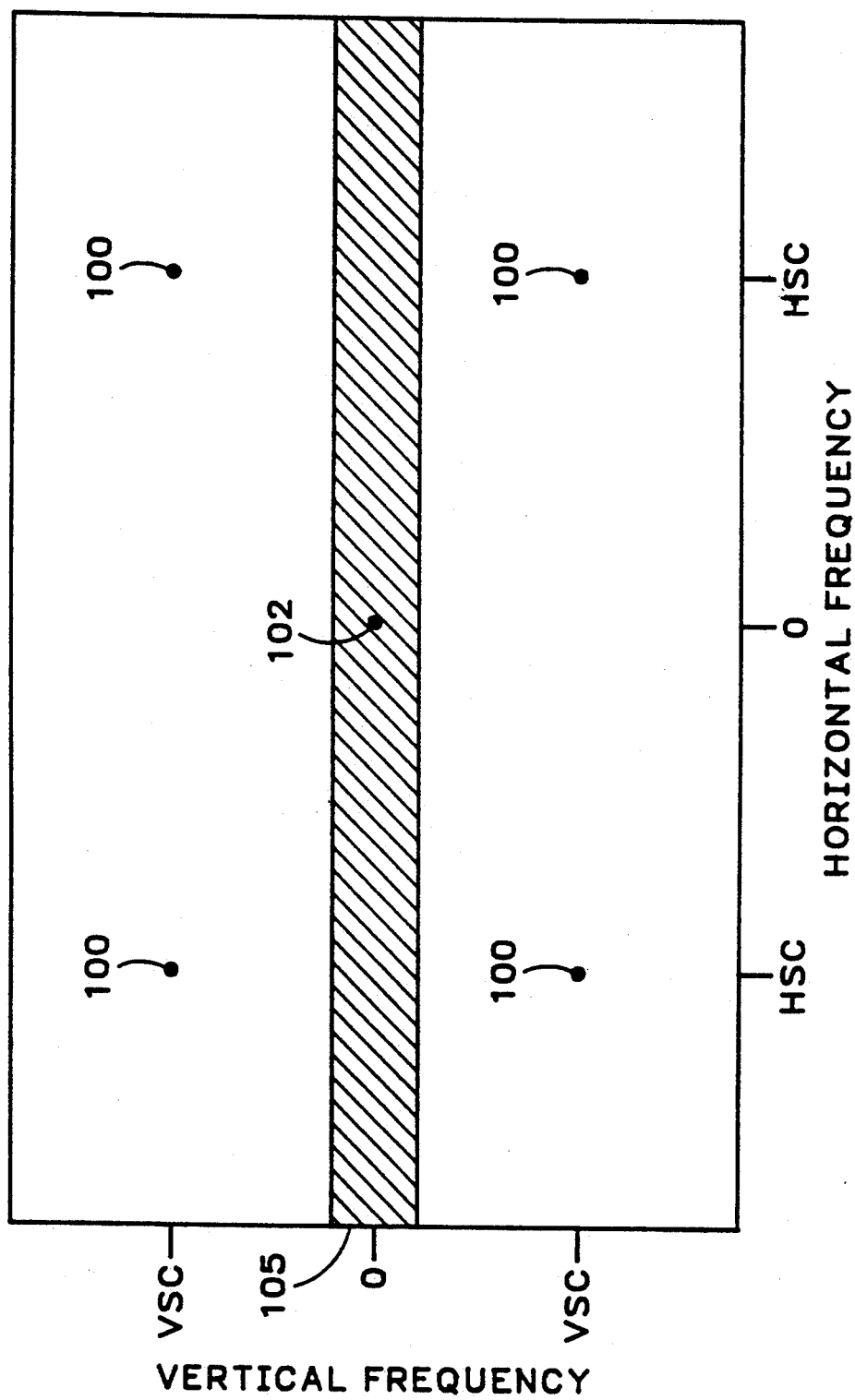
FIG. 9B is a graph illustrating the two-dimensional response of filter 104 of FIG. 5.
Figure 9C:
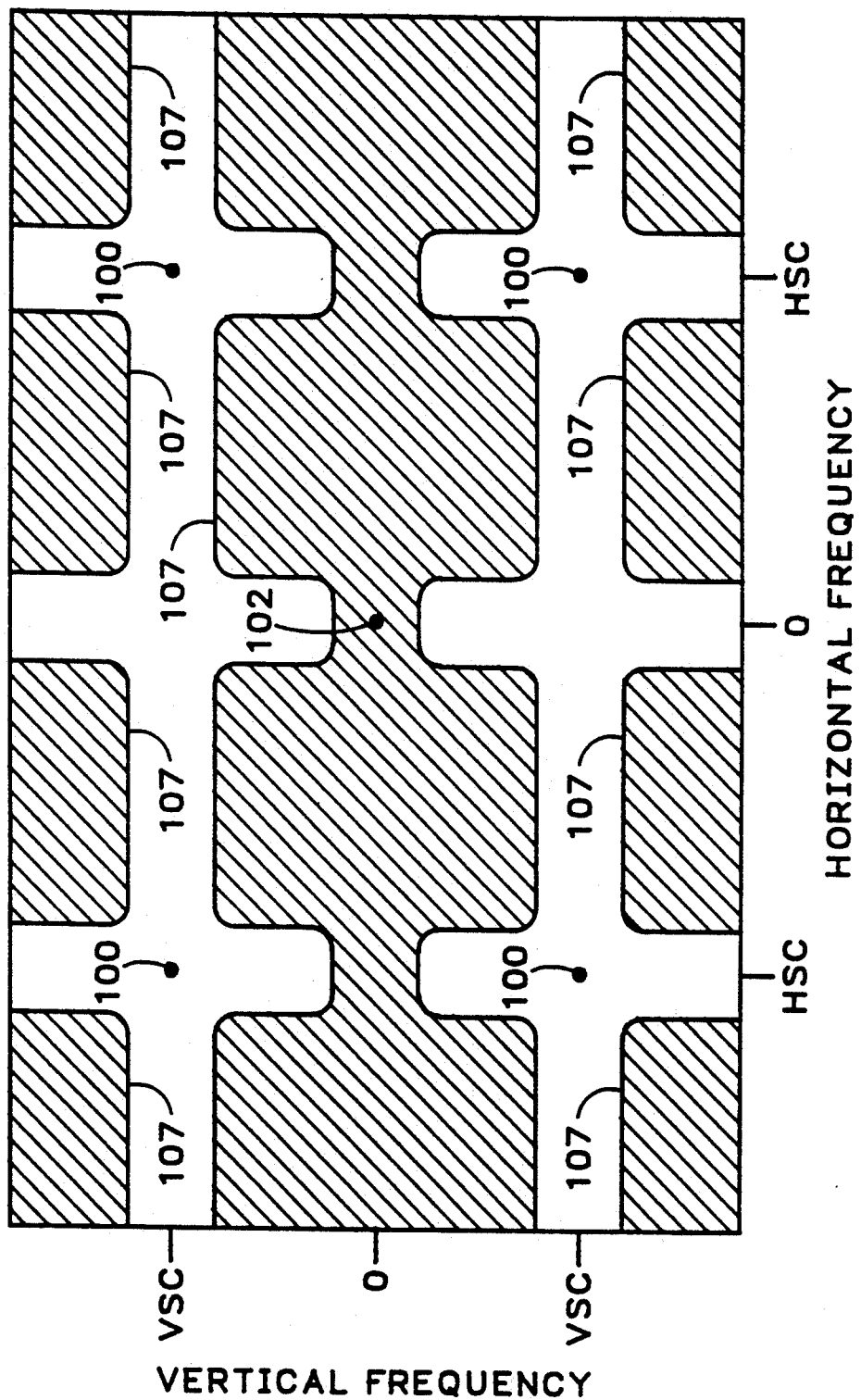
FIG. 9C is a graph illustrating the output of filter 104.

Optional vertical bandpass filter 104 has its passband centered about the vertical subcarrier frequency which is one half of the vertical sampling frequency (for NTSC), with a vertical frequency response as illustrated in FIG. 9A. Filter 104 preferably has numerous taps (nine or more) with a wider response than a vertical comb filter of the kind employed in the prior art. The two-dimensional response of filter 104 is illustrated at FIG. 9B wherein the stopband 105 comprises a horizontally extending area centered about zero vertical frequency. The output signal of filter 104 is shown with reference to FIG. 9C wherein areas 107 fall within the stopbands of the filter stages up through the output of filter 104 (filters 92, 94 and 104 and subtractor 96). All other areas fall within the passbands.

Figure 10A:
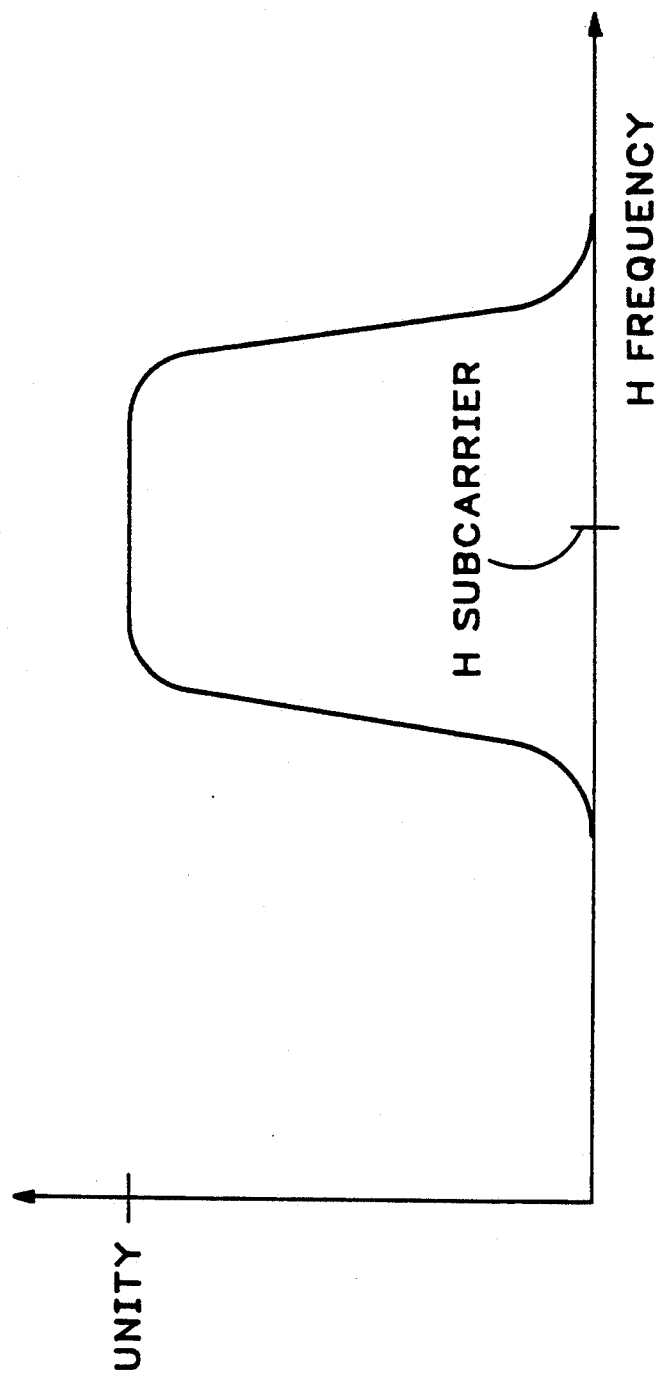
FIG. 10A is a graph of the horizontal frequency response of filter 106 of FIG. 5.

Horizontal bandpass filter 106, which receives signal output from filter 104, has its passband centered around the horizontal subcarrier frequency as illustrated in FIG. 10A. The independent response of filter 106 in two dimensions is illustrated in FIG. 10B wherein the passband is centered around the horizontal subcarrier frequency while the stopband comprises all other areas 109. Filter 106 may comprise, for example, a conventional chroma bandpass filter, suitably designed to be compatible with NTSC or PAL chroma bandwidth specifications. For NTSC, a switchable filter may be employed to filter I and Q chroma samples with differently shaped passbands.

Figure 11:
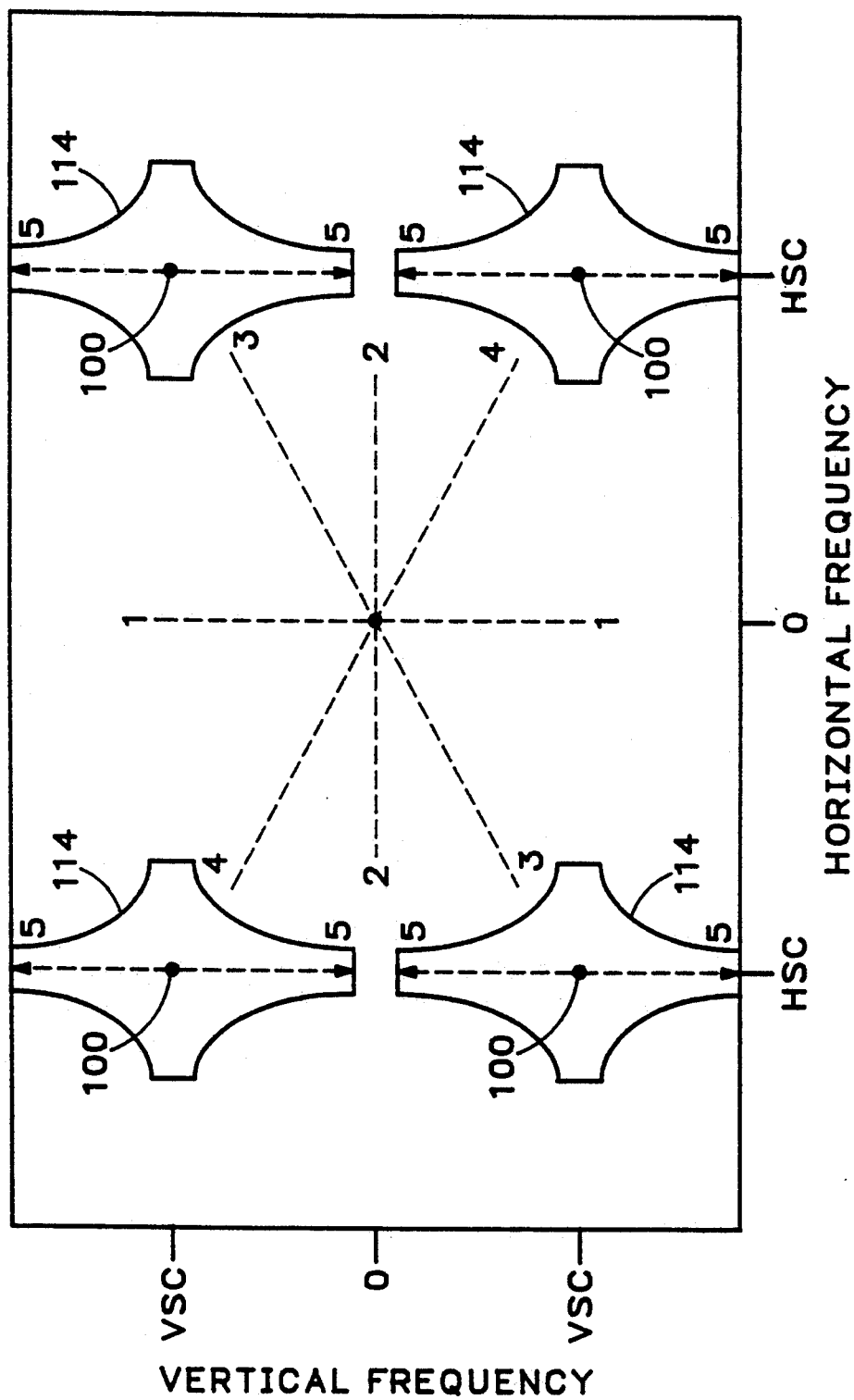
FIG. 11 is a graph illustrating the combined response of an inverse hyperbolic comb filter circuit.

FIG. 11 illustrates the frequency response of the combined stages of the inverse hyperbolic comb filter wherein areas 114 fall within the chroma passband of the entire filtering apparatus while all other areas are within the chroma stopband and are not passed through to the chroma output 110. Since the chroma component signal is also supplied as the subtrahend to subtractor 108, while a delayed version of the output of delay 98 (generated by delay stage 111, thereby comprising a twice delayed version of the encoded signal 90) is provided as the minuend of the subtractor, the output luma signal 112 is generated by removing the chroma component from the input signal. Delay 111 compensates for the delays inherent in filter 104 and filter 106. Chroma 110 and luma 112 may then be supplied as outputs from the filter.

Figure 1:
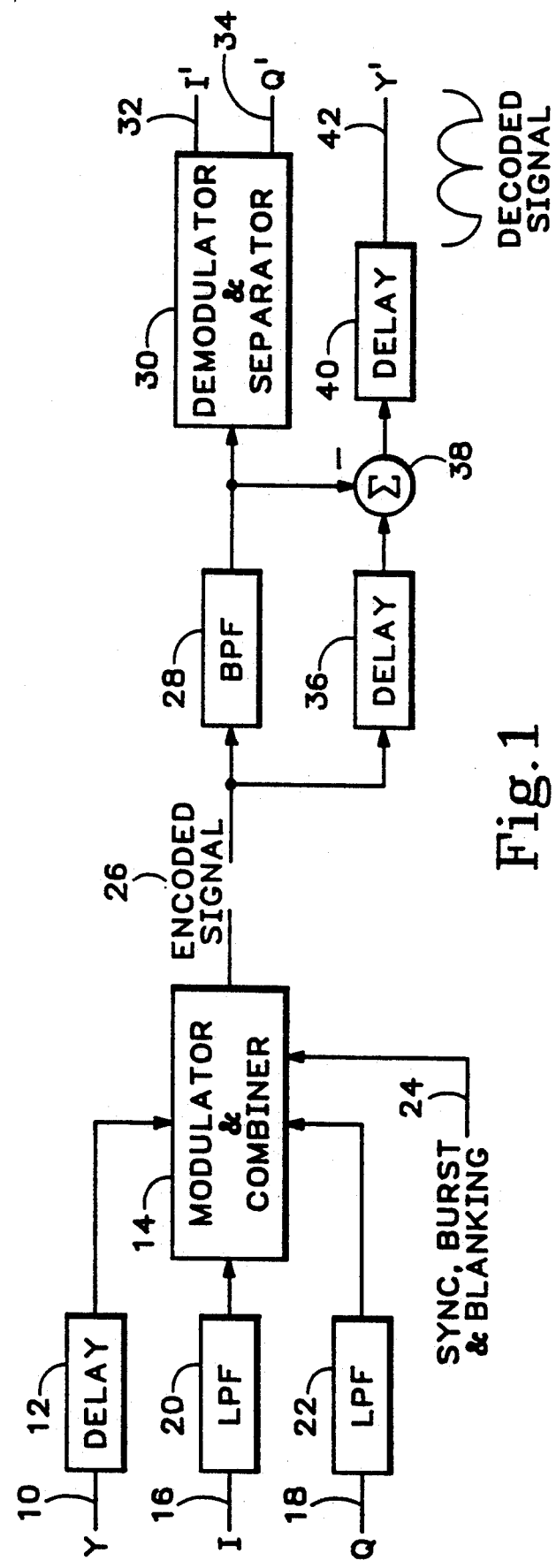
FIG. 1 is a block diagram of a prior art video signal encoding/decoding system employing one-dimensional filtering.
Figure 2:
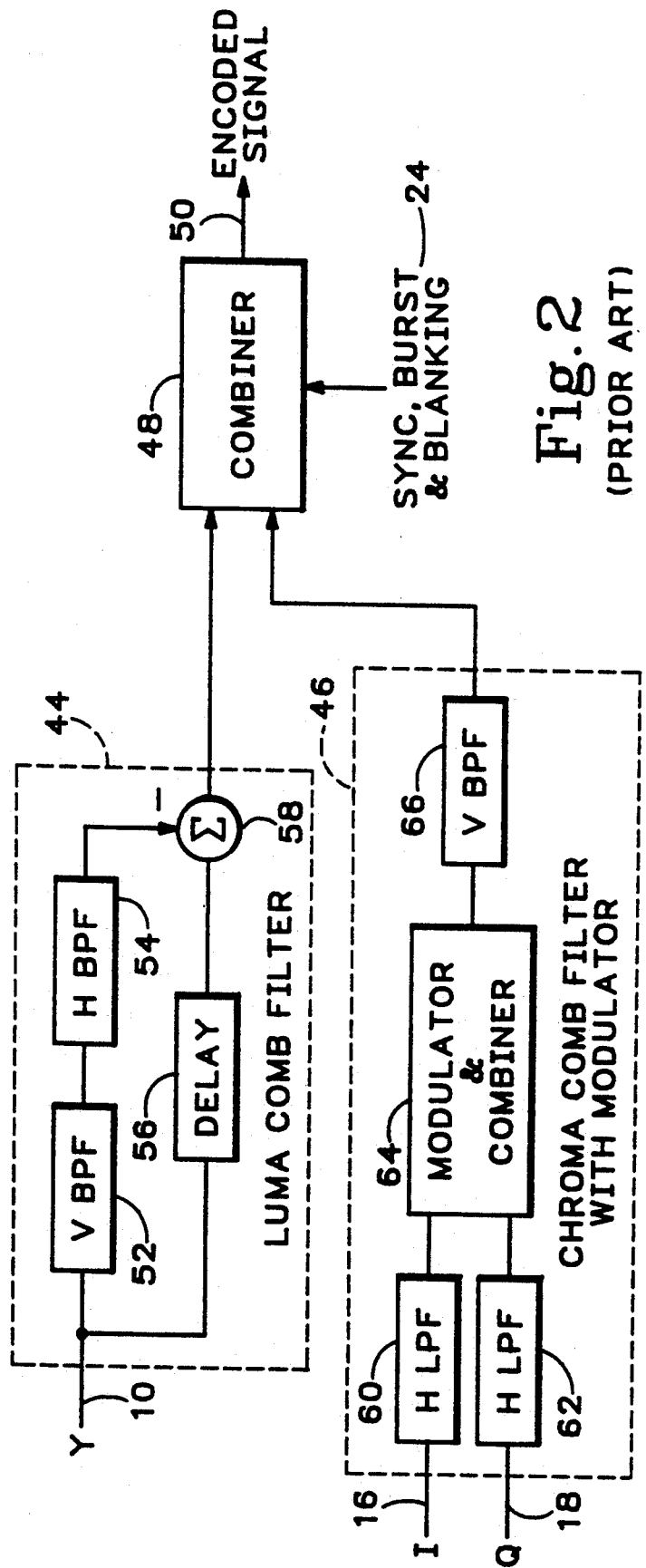
FIG. 2 is a block diagram of a video encoding circuit employing comb filtering according to the prior art.
Figure 3:
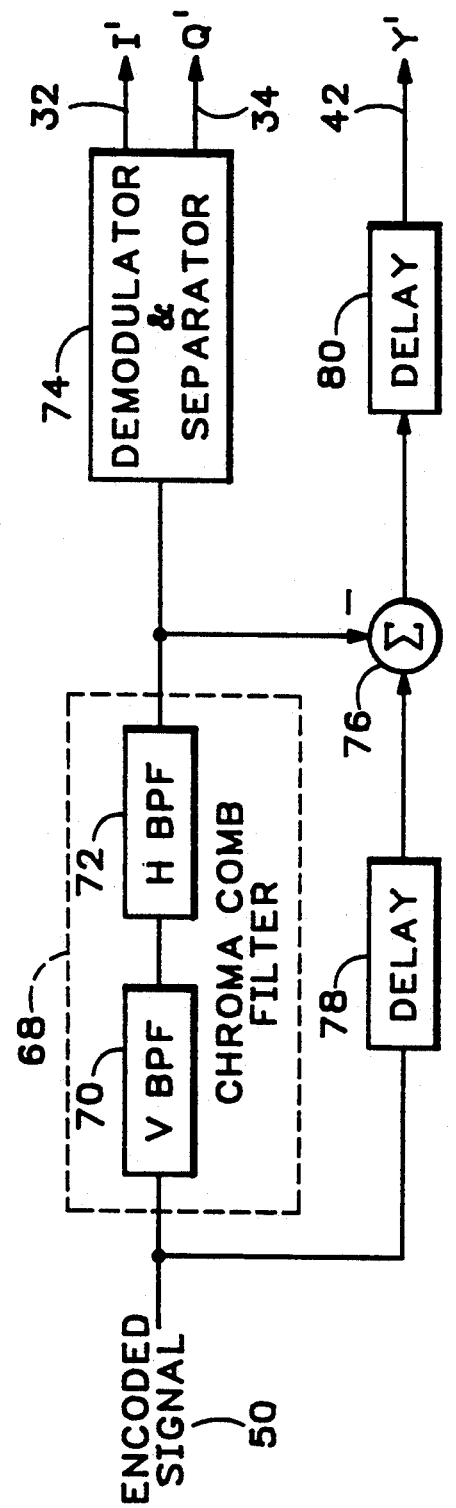
FIG. 3 is a block diagram of a video decoding circuit employing comb filtering in accordance with the prior art.
Figure 4:
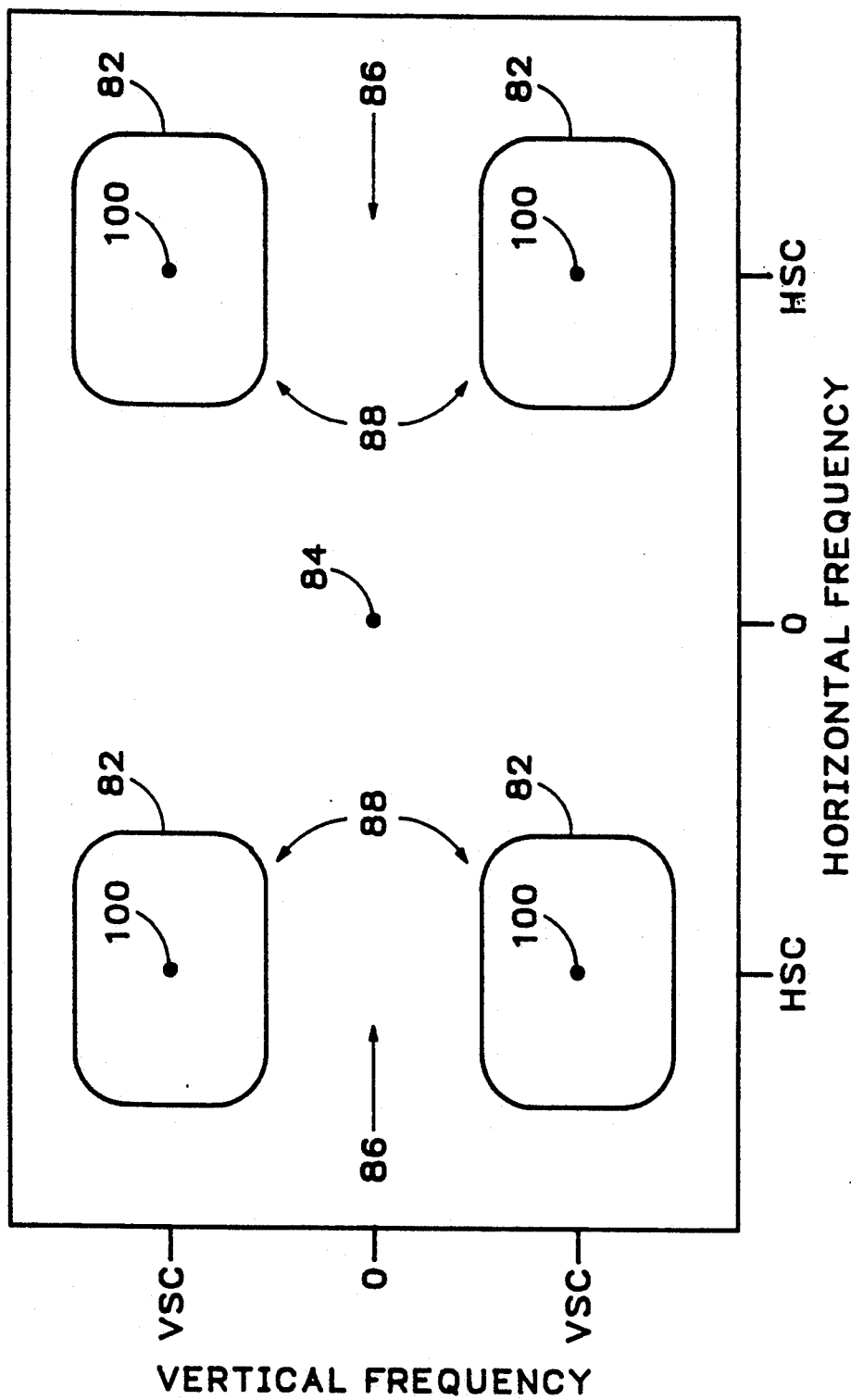
FIG. 4 is a frequency response diagram illustrating the response of a comb filtering encoding/decoding scheme in accordance with the prior art.

FIG. 11 also illustrates the luma response of the combined stages of the inverse hyperbolic comb filter wherein frequencies falling within the four chroma areas 114 (which are roughly hyperbolic in shape) fall within the stopband of the luma portion of the filter, and do not appear at luma output 112. Resolution of vertical and horizontal lines of luminance is maintained along axes 1—1 and 2—2 with the inverse hyperbolic comb filter. The filter also improves both diagonal luminance resolution along axes 3—3 and 4—4 and vertical chroma resolution along axis 5—5 relative to the response of filters of the prior art as shown in FIG. 4, reducing the likelihood of cross-color and cross-luminance.

Figure 12:
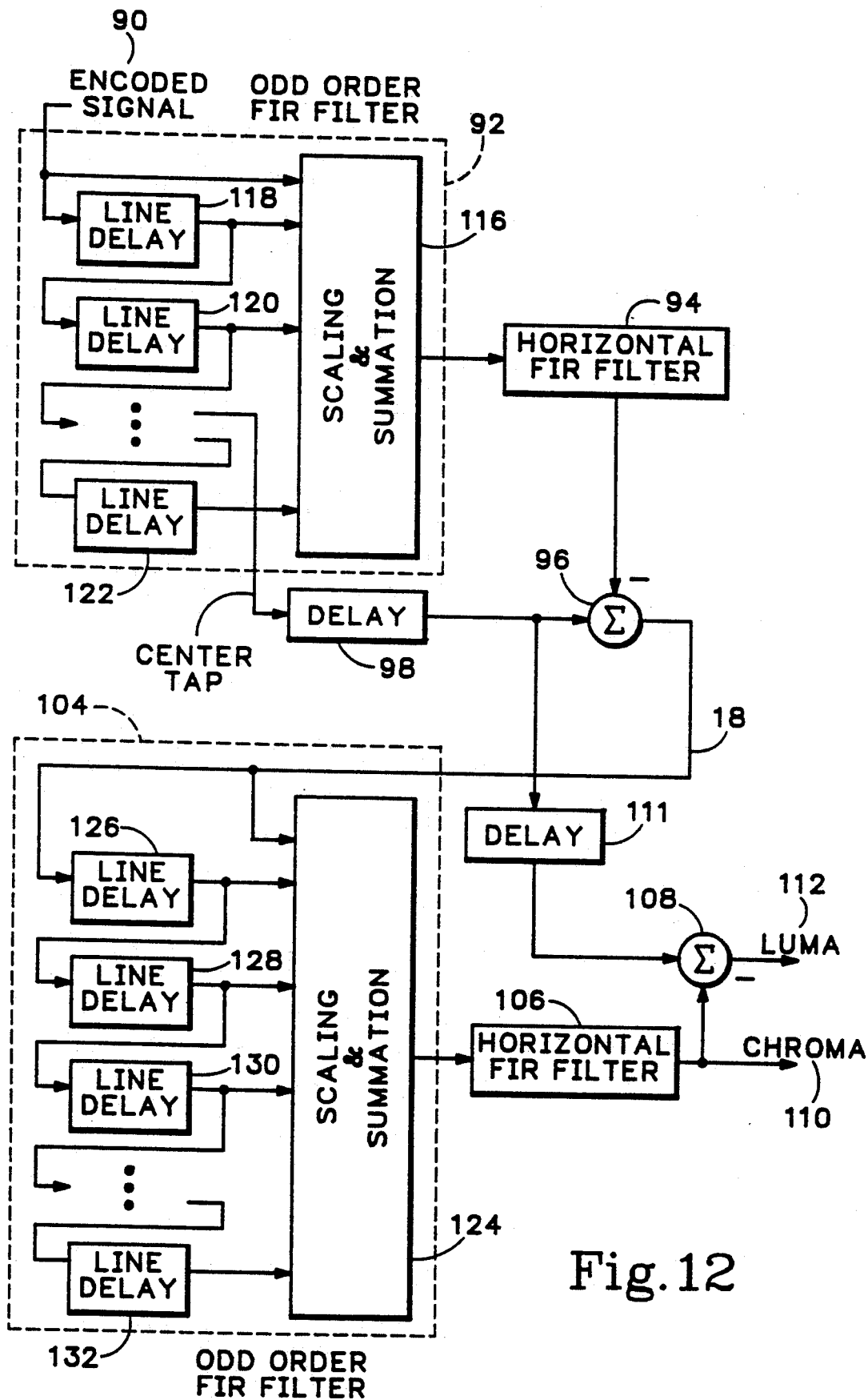
FIG. 12 is a more detailed block diagram of an inverse hyperbolic comb filter.

Referring now to FIG. 12, a more detailed block diagram of the inverse hyperbolic comb filter system of FIG. 5, an implementation of filters 92 and 104 is shown. Filter 92 includes line delays 118-122 connected in daisy chain fashion and a scaling and summation block 116 that receives the input signal and the output of the line delays. Block 116 scales each of its inputs based on filter coefficients that may be chosen. It may also be observed that the delay from the various line delays 118, 120, 122 may be employed to provide a part of the delay for delay 98 as supplied into subtractor 96. Vertical filter 104 is similar to filter 92 in that an odd order finite impulse response filter is employed with multiple daisy chained line delays 126, 128, 130 and 132 each providing a separate input to the scaling and summation block 124.

Figure 13:
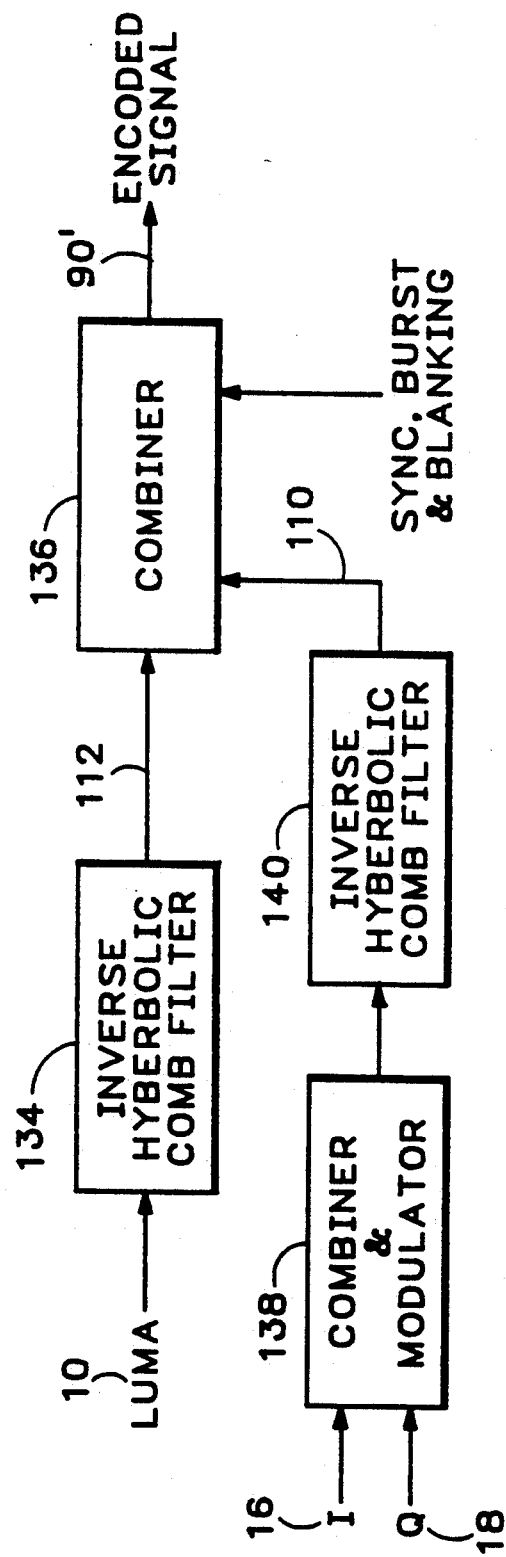
FIG. 13 is a block diagram illustrating the use of inverse hyperbolic comb filtering in an encoder.

Although the inverse hyperbolic comb filter has been described in connection with decoding an encoded video signal, it may also be used for encoding component signals. Thus, FIG. 13 illustrates a first inverse hyperbolic comb filter 134 receiving the luma signal at input 10 and generating a filtered luma output 112, supplied to combiner 136. The I and Q chroma components are supplied at inputs 16, 18 to combiner and modulator 138 which generates a combined chroma output, supplied to a second inverse hyperbolic comb filter 140 which generates filtered chroma output 110, also supplied as input to combiner 136. The combiner 136 also takes in sync, burst and blanking signals and produces an output encoded signal 90'.

Thus, with video signals for example, the luma signal is passed through a first inverse hyperbolic comb filter and the filter's luma output is used for encoding while the filter's chroma output is ignored. The chroma signals are combined and modulated and then supplied to the input of a second inverse hyperbolic comb filter and only the chroma output of this second filter is used. The filtered chroma and luma are then combined with sync, burst and blanking information to provide an encoded signal. Encoding in this manner removes much of the luma component falling in the chroma spectrum, ensuring that upon decoding, little remains of the luma signal that might be mistakenly interpreted as chroma by the decoding circuitry. Similarly, chroma signals falling within the luma spectrum are removed, thereby lessening the likelihood that chroma signals would be mistakenly interpreted as luma by a decoder.

FIG. 14 provides a more detailed block diagram of the encoder of FIG. 13, illustrating the first and second inverse hyperbolic comb filters (134, 140). The first filter 134 receives the input luma signal 10 and includes first vertical low-pass filter 92' receiving the input signal and providing filtered input to horizontal bandpass filter 94'. The output of the filter 94' is provided as the subtrahend for subtractor 96', while a delayed version of the input luma signal (as delayed by delay circuit 98') is supplied to the subtractor as the minuend. The resulting output signal is fed to optional vertical bandpass filter 104'. Output from filter 104' is further filtered by horizontal bandpass filter 106' and the signal from filter 106' is the subtrahend for subtractor 108'. A twice delayed input signal (delayed by delay 98' and delay 111') provides the minuend to subtractor 108'. The resulting subtracted output provides the filtered luma which is supplied to combiner 136.

Filter 140 includes vertical low-pass filter 92", which receives the input chroma signal and provides filtered input to horizontal bandpass filter 94". The output of the horizontal filter comprises the subtrahend for subtractor 96" and the delayed input signal (as provided by delay 98") is the minuend for subtractor 96. The resulting subtractor output signal becomes the input for optional vertical bandpass filter 104". Filtered output from vertical filter 104" is then supplied as input to horizontal bandpass filter 106" and the resulting output provides chroma 110', supplied to combiner 136. It may thus be appreciated that filter 134 is an inverse hyperbolic comb filter for luma only while filter 140 is an inverse hyperbolic comb filter for chroma only.

While the foregoing examples have employed the inverse hyperbolic comb filter of the present invention with NTSC video signals, other signals may be advantageously filtered with the present invention. For example, the invention may be applied to PAL signals by replacing all single line delays with delays of two line duration.

The invention may also be applied to any system employing combining of two-dimensional signals via quadrature modulation and subsequent separation of those signals, e.g., future advanced television systems.

Inverse hyperbolic comb filters may also be employed in three dimensional encoding and decoding systems in that when little or no motion is detected for a video signal (i.e., no change from frame-to-frame in the picture represented by the video signal) separation is achieved through frame to frame or field to field filtering (filtering one frame or field relative to the previous or next frame or field), but when motion is detected, the inverse hyperbolic comb filter, or a combination of the inverse hyperbolic comb filter and three dimensional filtering, would be used.

It will be appreciated that the invention is not restricted to the particular embodiments that have been described and that variations may be made therein without departing from the scope of the invention as defined in the appended claims and equivalents thereof.

I claim:

1. A filter for filtering a two-dimensional input signal comprising:
    a first filter stage for receiving the input signal and filtering the signal in a first of the two dimensions;
    a second filter stage for receiving the output from said first filter stage and filtering the first filter stage output in a second of the two dimensions;
    a first subtractor for receiving the output of said second filter stage as a first input for subtraction from a delayed version of the input signal as a second input; and
    a third filter stage for receiving the output of said first subtractor, filtering the first subtractor output in said second dimension and producing a first filtered output signal.

2. A filter according to claim 1 further comprising a second subtractor for receiving the first filtered output signal for subtraction from a further delayed version of the input signal and producing a second filtered output signal.

3. A filter according to claim 1 further comprising:
    a fourth filter stage interposed between said first subtractor and said third filter stage for filtering the output of said first subtractor in said first dimension and supplying the filtered output of the first subtractor to said third filter stage.

4. A filter according to claim 3 wherein said fourth filter stage comprises a bandpass filter with a passband centered at a subcarrier frequency for said first dimension.

5. A filter according to claim 1 wherein said first filter stage has a frequency response so as to pass signals falling below a subcarrier frequency for said first dimension.

6. A filter according to claim 1 wherein said second filter stage comprises a passband filter with a passband centered at one half of a subcarrier frequency for said second dimension.

7. A filter according to claim 1 wherein said third filter stage comprises a bandpass filter with a passband centered at a subcarrier frequency for said second dimension.

8. A method for filtering a two-dimensional input signal comprising the steps of:
    filtering the input signal in a first of the two dimensions to produce a first filtered signal;
    filtering the first filtered signal in a second of the two dimensions to produce a second filtered signal;
    subtracting the second filtered signal from a delayed version of the input signal to produce a third filtered signal; and
    filtering the third filtered signal in the second dimension to produce a first output signal.

9. The method according to claim 8 wherein said two-dimensional input signal is a composite video signal including color burst and wherein
    the step of filtering the input signal comprises filtering with a filter having a frequency response so as to pass signals falling below a subcarrier frequency for said first dimension,
    the step of filtering the first filtered signal comprises filtering with a bandpass filter having a passband centered at one half of a subcarrier frequency for said second dimension, and
    the step of filtering the third filtered signal comprises filtering with a bandpass filter having a passband centered at the subcarrier frequency for said second dimension.

10. The method according to claim 8 wherein said two-dimensional input signal is a composite video signal and wherein said first output signal is a chroma component of said composite video signal.

11. The method according to claim 8 further comprising the step of:
    filtering the third filtered signal in the first dimension before filtering the third filtered signal in the second dimension.

12. The method according to claim 11 wherein said two-dimensional input signal is a composite video signal including color burst and wherein the step of filtering the input signal comprises filtering with a filter having a frequency response so as to pass signals falling below a subcarrier frequency for said first dimension, the step of filtering the first filtered signal comprises filtering with a bandpass filter having a passband centered at one half of a subcarrier frequency for said second dimension, and the step of filtering the third filtered signal in the second dimension comprises filtering with a bandpass filter having a passband centered at the subcarrier frequency for said second dimension.

13. The method according to claim 8 further comprising the step of:

subtracting the first output signal from a delayed version of the input signal to provide a second output signal.

14. The method according to claim 13 wherein said two-dimensional input signal is a composite video signal and wherein said first output signal is a chroma component of said composite video signal and said second output signal is a luma component of said composite video signal.

15. A comb filter for filtering an input video signal having a component at a selected subcarrier frequency comprising:

a first vertical filter for receiving the input video signal and having a stopband centered about a vertical subcarrier frequency of the input video signal;

a first horizontal filter for receiving the output of said first vertical filter and having a passband centered about one half of a horizontal subcarrier frequency;

a first subtractor for receiving the output of said first horizontal filter for subtraction from a delayed version of the input video signal;

a second vertical filter for receiving the output of said first subtractor and having a passband centered about the vertical subcarrier frequency;

a second horizontal filter for receiving the output of said second vertical filter and having a passband centered about the horizontal subcarrier frequency for producing a first filtered output signal; and a second subtractor for receiving the first filtered output signal for subtraction from a further delayed version of the input video signal and producing a second filtered output signal.

* * * * *